United States Patent [19]

Wilkow

[11] 4,423,321
[45] Dec. 27, 1983

[54] CALCULATING SYSTEM

[76] Inventor: Ira Wilkow, 8500 Boulevard E., North Bergen, N.J. 07047

[21] Appl. No.: 291,458

[22] Filed: Aug. 10, 1981

[51] Int. Cl.³ ............................................. G09B 7/00
[52] U.S. Cl. ................................... 235/489; 235/419; 235/433; 434/170; 434/118
[58] Field of Search ....................... 235/489, 419, 433; 434/118, 119, 207

[56] References Cited

U.S. PATENT DOCUMENTS

| | | | |
|---|---|---|---|
| 3,357,113 | 12/1967 | Hagelbarger | 434/118 |
| 3,977,092 | 8/1976 | Duncan | 235/489 |
| 3,982,333 | 9/1976 | Farmer | 434/170 |
| 4,051,608 | 10/1977 | Duncan | 235/489 |

Primary Examiner—G. Z. Rubinson
Assistant Examiner—Robert Lev
Attorney, Agent, or Firm—Natter & Natter

[57] ABSTRACT

An instruction set for solving a specific mathematical problem includes a column of sheet material for manual entry of data in appropriate horizontal spaces as designated by the instruction set. The spaces include color indicia corresponding to color indicia appearing on function keys of an electronic calculator. A carrier is provided to receive the sheet material column with the carrier being slidably received within the calculator. The calculator includes an aperture which successively exposes each horizontal space when the carrier is moved relative to the calculator housing. To solve the problem, the user enters the numerals appearing in the space exposed by the aperture by depressing appropriate calculator numeral keys and then depresses the calculator function key corresponding to the color appearing within the aperture. In some instances, the numerical data appearing in selected spaces may be preprinted. In an alternate embodiment, a bracket removably attaches to the calculator housing. The bracket receives the carrier and includes an aperture for exposing spaces on the column.

9 Claims, 6 Drawing Figures

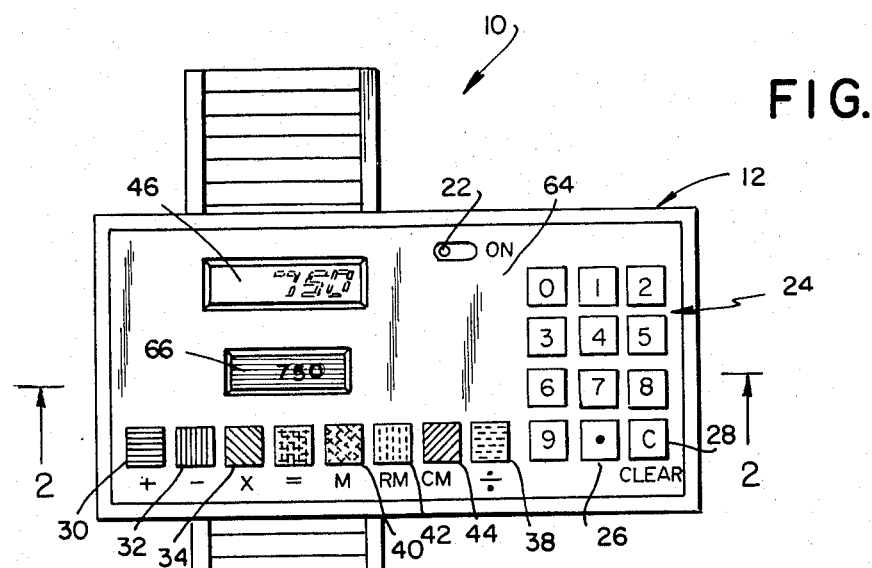
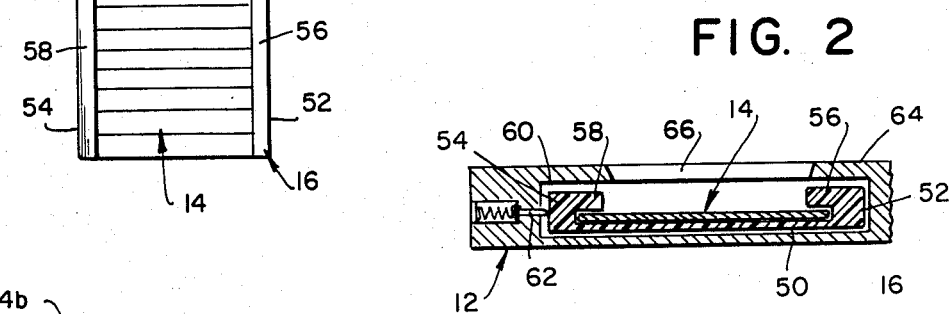
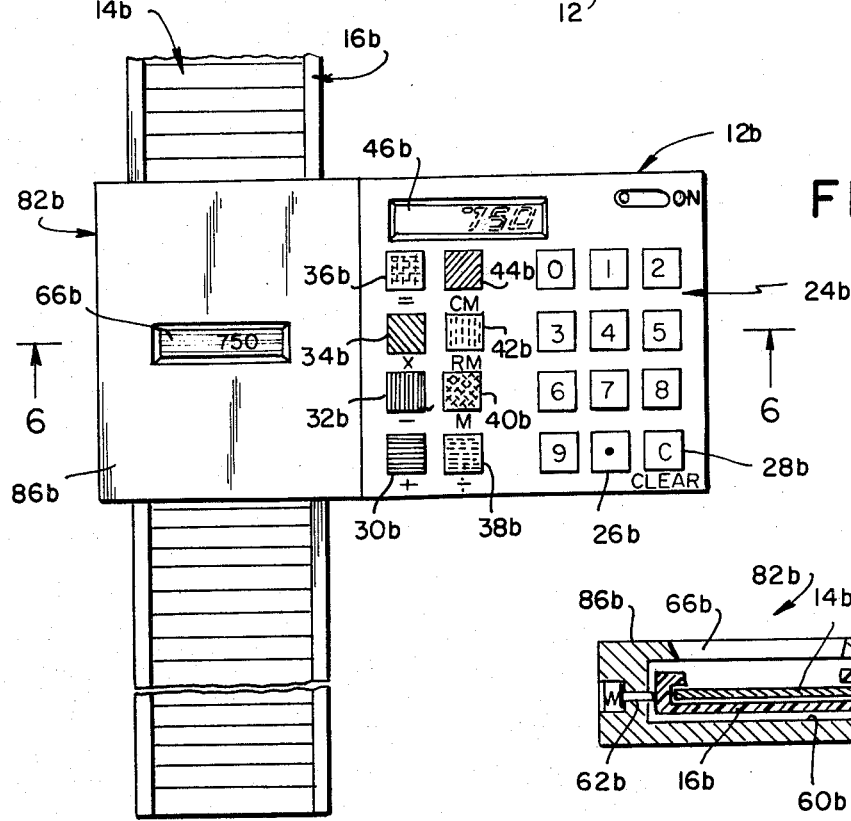
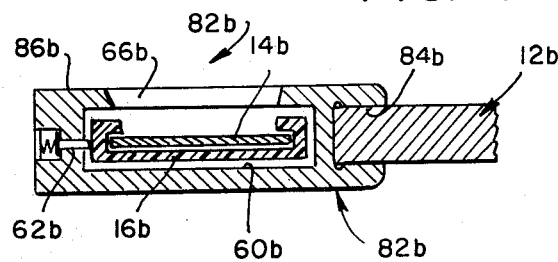

FIG. 3

| | | | | |
|---|---|---|---|---|
| STATEMENT | | | | |
| IRA NEW YORK BANK, N.A. 54 FIFTH AVE NEW YORK | | | | |
| OPENING BALANCE : $ 502.28 CLOSING BALANCE $ 863.42 | | | | 863.42 |
| DATE | DEBIT | CREDIT | BALANCE | |
| 5/31/81 | | | 502.28 | 1_ ENTER DEPOSITS SINCE CLOSING IN BLUE SPACES |
| 6/03/81 | 42.00 | | 460.28 | |
| 6/05/81 | 136.14 | | 324.14 | |
| 6/09/81 | | 75.00 | 399.14 | |
| 6/11/81 | | 300.00 | 699.14 | |
| 6/15/81 | 156.32 | | 542.82 | 2_ ENTER OUTSTANDING CHECKS IN RED SPACES |
| 6/15/81 | 14.98 | | 527.84 | |
| 6/18/81 | 58.67 | | 469.17 | |
| 6/23/81 | | 600.00 | 1069.17 | 3_ ENTER SERVICE CHARGE IN RED SPACES |
| 6/23/81 | 243.65 | | 726.52 | |
| 6/25/81 | 496.30 | | 230.22 | |
| 6/29/81 | | 750.00 | 980.22 | |
| 6/29/81 | 48.80 | | 931.42 | |
| 6/30/81 | 68.00 | | 863.82 | |

4_ ENTER YOUR CHECK BOOK BALANCE HERE & TEAR OFF THE STRIP →

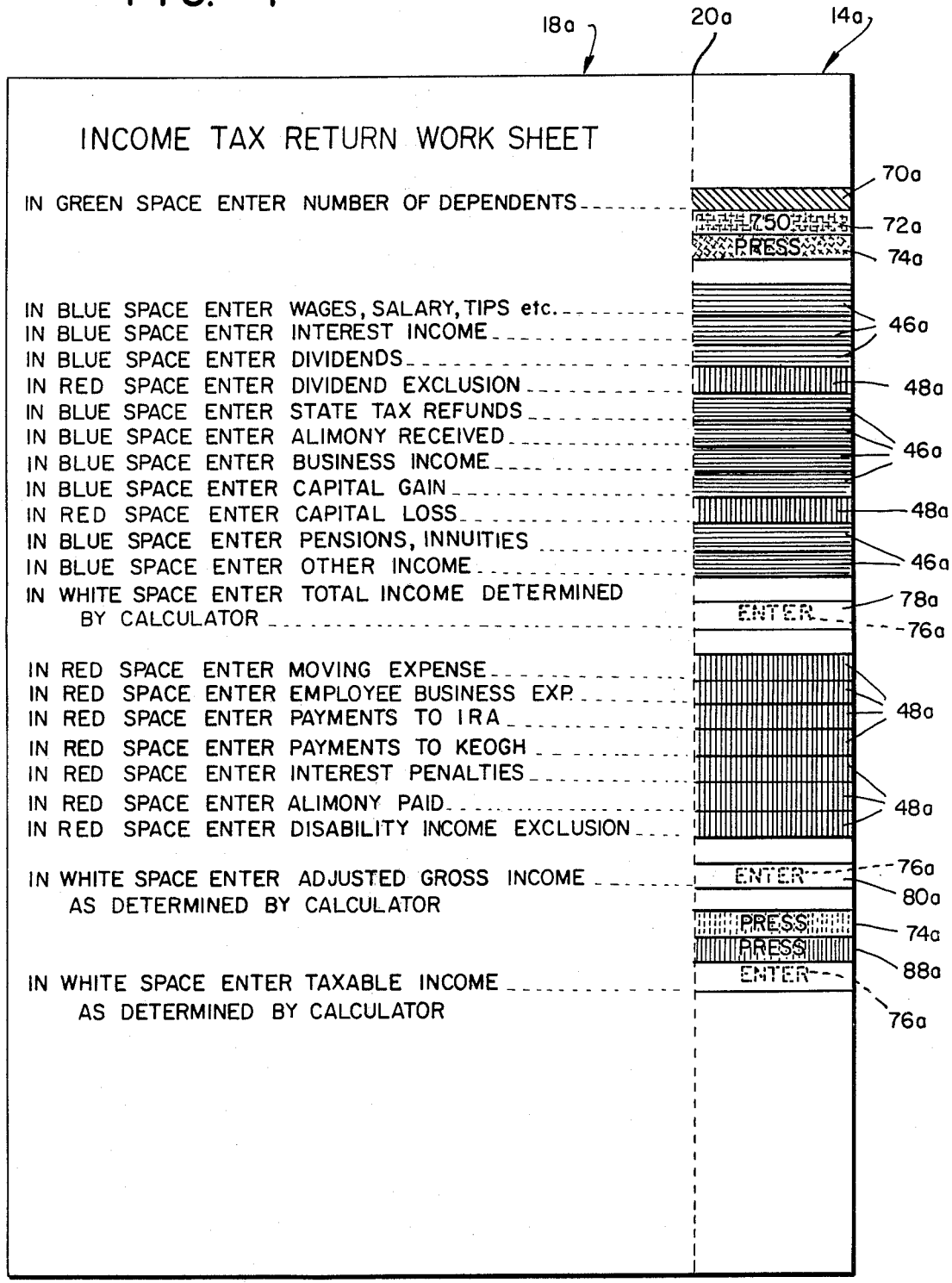

CALCULATING SYSTEM

BACKGROUND OF THE INVENTION

1. Field of the Invention

This invention relates generally to calculating devices and more particularly to a system for simplifying the use of an electronic calculator through employment of a calculator function key coordinated instruction set.

2. Brief Description of the Prior Art

In the past several years, portable electronic calculators have gained widespread acceptance due to cost reductions including those made possible through the employment of integrated circuits. In addition, pocket calculators capable of performing sophisticated mathematical functions have become readily available at reduced costs which were inconceivable years ago. The widespread use of such devices has virtually replaced mechanical adding machines and similar calculating devices which were to be found in business offices.

Unfortunately, the capabilities of such electronic calculators often exceeded the needs and/or understanding of potential users. One might wonder what use would be put to an electronic calculator capable of exponential function calculations by a prospective purchaser who was encountering difficulty in balancing a checkbook. The sophisticated capabilities of calculators have thus dissuaded potential users.

Applicant has appreciated the need for simplified instructions for the use of electronic calculators in the solving of problems encountered by the layman who did not have a strong grasp of mathematical concepts.

SUMMARY OF THE INVENTION

In compendium, the invention comprises a calculating system which includes an instruction set comprising simplified step-by-step instructions for the solving of a particular problem. The instruction set includes a column or strip of sheet material with the instruction set directing the user to insert or enter appropriate numerical data such as the listing of all outstanding checks in a checking account. The spaces wherein such data is entered includes appropriate calculator function indicia such as, for example, a space may be colored a particular color.

After completing the instructions provided in the instruction set, the user inserts the column carrying the numerical data entered into a carrier which is slidably recieved within an electronic calculator. The calculator includes an aperture or window which successively exposes each of the spaces on the column. As the carrier is moved to expose successive spaces, the user enters the numerical data appearing in each space and then depresses a calculator function key which is colored the same color as the indicia appearing within the aperture.

The user thus operates the calculator without the necessity of knowing the particular functions which are being performed.

From the foregoing summary, it will be appreciated that it is an object of the present invention to provide a calculating system of the general character described which is not subject to the disadvantages of the prior art aforementioned.

A further object of the present invention is to provide a calculating system of the general character described which includes a simplified instruction set for use in conjunction with an electronic calculator and wherein calculator function keys include indicia corresponding to indicia on the instruction set.

A further object of the present invention is to provide a calculating system of the general character described which is suitable for use by persons who have limited mathematical knowledge.

A further object of the present invention is to provide a calculating system of the general character described which simplifies the operation of an electronic calculator.

A still further object of the present invention is to provide a calculating system of the general character described which is suitable for economical mass fabrication techniques and low cost production.

Yet a further object of the present invention is to provide a calculating system of the general character described which simplifies the steps required for solving particular problems.

Other objects of the present invention in part will be obvious and in part will be pointed out hereinafter.

With these ends in view, the invention finds embodiment in certain combinations of elements and arrangements of parts by which the said objects and certain other objects are hereinafter attained, all with reference to the accompanying drawing and the scope of which is more particularly pointed out and indicated in the appended drawings.

BRIEF DESCRIPTION OF THE DRAWINGS

In the accompanying drawings wherein one of the possible exemplary embodiments of the invention is shown:

FIG. 1 is a plan view of a calculating system constructed in accordance with and embodying the invention and illustrating a column of sheet material bearing numerical data and color indicia and which is received within a carrier which is, in turn, slidably received within a passageway of an electronic calculator;

FIG. 2 is an enlarged scale fragmentary sectional view through the calculator and carrier and showing an aperture formed in the calculator for selectively exposing successive spaces in the column;

FIG. 3 is a plan view of a typical instruction set for use in conjunction with the calculating system of the present invention, the set comprising a bank checking account statement and instructions for reconciling the user's statement through the entry of numerical data in appropriate colored spaces on a column;

FIG. 4 is a plan view of a further instruction set adapted for use in conjunction with the calculating system of the present invention wherein the instruction set comprises an income tax return work sheet also bearing instructions for the entry of numerical data in appropriate colored spaces provided on a column of sheet material;

FIG. 5 is a view of an alternate embodiment of the invention wherein a modified calculator is detachable from a bracket which receives the carrier; and FIG. 6 is an enlarged fragmentary sectional view through the calculator and bracket taken along line 6—6 of FIG. 5.

DESCRIPTION OF THE PREFERRED EMBODIMENT

Referring now in detail to the drawings, the reference numeral 10 denotes generally a calculating system constructed in accordance with and embodying the present invention. The system 10 includes a lightweight portable electronic calculator 12 and a strip or column of sheet material 14 which is positioned within an elongate carrier 16. Pursuant to the invention, the column 14 of sheet material may comprise a portion of a larger sheet 18 carrying an instruction set 68. The strip column 14 is separable from the instruction set sheet 18 along a line 20 of perforations. From a circuitry standpoint, the calculator 12 is of conventional design and includes a suitable power switch 22, a plurality of numeral entry keys 24, a decimal point key 26 and a clear key 28. In addition, a plurality of function keys are provided. The function keys include: an addition key 30, colored for example in blue; a subtraction key 32, colored for example in red; a multiplication key 34, colored in green for example; an equal sign key 36, colored in yellow for example; and a division key 28, colored in gray for example. The calculator 12 may include one or more memories and suitable memory function keys such as: a memory entry key 40, colored for example in orange; a memory recall key 42 colored, for example, in violet; and a memory clear key 44 colored, for example, brown.

The calculator 12 also includes a suitable display 46 such as a seven segment liquid crystal display of conventional design.

Pursuant to the present invention, the instruction set 68 imprinted upon the sheet 18 includes detailed directions for a user to enter numeric data within particular spaces formed on the column 14. For example, the column 14 may include a plurality of spaces 46 which are colored blue and a plurality of spaces 48 which are colored red. After inserting the numeric indicia in the appropriate spaces, the user separates the column 14 from the sheet 18 along the perforated line 20 and then inserts the column 14 into the elongate carrier 16.

The carrier 16 includes a relatively stiff bottom panel 50, a pair of side walls 52, 54 which project upwardly from the bottom panel 50 and a pair of lips 56, 58 which project inwardly from each of the side walls 52, 54, respectively.

From an examination of FIG. 2 it will be observed that the column of sheet material 14 is received between the lips 56, 58 and the upper surface of the bottom panel 50. It will also be observed that a transverse passageway 60 extends through the calculator 12 between the front and rear edges for receiving the carrier 16. In order to provide indexing of the carrier 16 and column 14 at a selected position within the passageway 60, a spring loaded detent pin 62 may project from a side wall of the passageway and engege successive indentations formed in the side wall 54 of the carrier 16.

A top panel 64 of the calculator 12 includes an aperture window 66 for selectively exposing individual spaces of the column 14. When the carrier 16 is urged through the passageway 60, the successive spaces in the column are exposed, one at a time, in the aperture window 66. As each space is exposed in the aperture window 66, the user will depress the appropriate numeral keys 24 corresponding to the numeric data appearing through the aperture 66 and then press the appropriate function key corresponding to the colored indicia appearing in the aperture 66. As such, the user will operate the calculator to perform necessary mathematic functions without having to know or be cognizant of the particular functions being employed.

An example of a typical instruction set which may be employed for the purpose of reconciling a checking account bank statement with the user's checkbook is illustrated in FIG. 3. The sheet 18 may comprise a computer generated monthly statement and the computer printer may provide an initial entry at an uppermost blue colored space 46 of the column 14, which entry is the user's closing balance. Optionally, the user will manually enter such balance.

A checking account instruction set 68 imprinted on the sheet 18 instructs the user to enter the amounts of deposits made into the account since the closing date in a plurality of spaces 46 also colored blue. The instruction set thereafter directs the user to enter each outstanding check in a plurality of red spaces 48 and to also enter service charges in such red spaces. An instruction of the instruction set 68 is for the user to enter the present checkbook balance in a final white space 70. This is for the purpose of verifying the checkbook balance as determined by the calculator 12.

After completing the steps set forth in the instruction set 68, the user separates the column 14 from the sheet 18 along the line of perforations 20, slips the column 14 into the carrier 16 and then inserts the carrier 16 into the passageway 60.

Optionally, the columns 14 may be separate from the instruction set and be part of a pad of sheets with the instruction set placed adjacent the uppermost sheet column to assist the user in making entries.

The first space observed at the aperture window 66 is the user's closing balance which can either be pre-entered by the bank's computer, as shown, or which has been entered by the user pursuant to an initial instruction of the instruction set 68. The user would, after turning the power switch 22 on, depress the numeral keys 24 and the decimal point key 26 so that the display 46 indicates the numeric value visible through the aperture 66.

Thereafter, the user depresses the function key corresponding to the color of the background visible in the aperture 66. Then, the carrier 16 is advanced to expose the next space with the carrier position being indexed by the detent pin 62. If numeric data is visible, the numbers are entered through the numeral entry keys 24 and the correspondingly colored function key is depressed. If no numeric data or instruction is visible, the user proceeds to the succeeding space in the column 14.

Upon reaching the spaces 48, the user will depress the appropriate numeral entry keys 24 to visibly display the numeric data in the aperture 66 and then depress the function key correspondingly colored to the background color visible through the aperture. In this instance, the function key will be the red key 32. After completing all of the entries, the display will indicate the appropriate checkbook balance which may then be compared to the balance entered by the user in the space 70.

It should be appreciated that instruction sets may be provided for more sophisticated computations rather than or in addition to checkbook balancing. For example, memory capabilities of the calculator may be employed as well as multiplication and division functions. An example of an instruction set employing additional function keys is illustrated in FIG. 4 wherein a sheet 18a includes an income tax instruction set 68a which instructs the user to enter appropriate data in spaces provided in a column 14a which is separable from the sheet 18a by a perforation line 20a.

The instruction set 68a includes instructions for multiplication and memory functions of the calculator 12 as indicated in the initial three spaces provided in the column 14a. The user is instructed to enter the number of dependents at a first space 70a colored in green. The amount of exemption for each dependent is preprinted in a subsequent space 72a colored yellow and in a further space 74a colored in orange, a preprinted word instruction is found.

The instruction set includes further instructions for the entry of taxable income items in various spaces 46a colored in blue and income deduction items in red colored spaces 48a.

The instruction set 68a also includes a printed instruction for depressing a violet function key (memory recall) in a space 74a and a printed instruction for depressing a red function key (subtraction) in a space 88a. In addition, the selected spaces of the column may include written instructions 76a for the user to write the numerals appearing in the display 46 on the appropriate spaces as accessed through the aperture 66.

After the user separates the column 14a from the sheet 18a, it is inserted into the carrier 16 and through the aperture 60 into the calculator 12. Thereafter, the user will first enter the number of reportable dependents and then press the green function key which will instruct the calculator to proceed with a multiplication. Thereafter, upon advancing to the successive space 72a, the user will enter the preprinted number 750 and then press the yellow key which will provide a multiplication result. Then, the user advances to the next space 74a and reads the instruction "PRESS" appearing in an orange background. Once the user presses the orange colored function key, the calculated deduction amount for dependents is stored in the calculator memory.

As the user thereafter advances the holder 16, taxable income items are entered and added and deductions from income are subtracted. Upon reaching a space 78a, the user will read the word "ENTER" and will write the number appearing in the display through the window 66 and onto the space 78a. Thereafter, the user proceeds with the entry and subtraction of deductions until reaching a space 80a whereupon the user will write the number appearing in the display through the window 66 and onto the space 78a. Thereafter, the user proceeds with the entry and subtraction of deductions until reaching a space 80a whereupon the user will write the number appearing in the display in such space through the aperture 66 which amount is the user's adjusted gross income. The user then advances to the space 74a and, upon reading the instruction appearing therein, depresses the memory recall key 42 which is colored violet corresponding to the color appearing in the aperture. The depression of such key recalls the previously calculated income deduction amount for dependents stored in the memory. The user then proceeds to the next sequential space and upon reading the preprinted instruction "PRESS" will depress the red key 32 which corresponds to the background of the space appearing in the aperture window 66. As a result of the depression of such key, the display 46 will indicate the user's taxable income. Upon advancing to the next sequential space, the user is instructed to write such amount appearing in the display in the space appearing through the aperture.

It will be appreciated that further instruction sets may be provided for problems wherein additional features and functions of the calculator 12 or other calculators are employed.

In an alternate embodiment of the invention illustrated in FIGS. 5 and 6, like numerals are employed to denote like components as previously described with reference to the prior embodiments, however bearing the suffix "b." In this embodiment, a calculator 12b is similar in construction to the calculator 12 previously described. The calculator 12b does not, however, include a housing having a passageway for receiving a carrier 16b. A separable carrier receiving bracket 82b is releasably secured to the calculator 12b. The bracket 82b includes a side edge having an aperture 84b adapted to be snap-fitted over a side edge of the calculator 12b as illustrated in FIG. 6.

The bracket 82b includes an upper panel 86b having an aperture 66b for viewing successive spaces on a column 14b which is carried in the carrier 16b. As with the prior embodiment, the carrier 16b may be selectively indexed by a detent pin 62b which projects from the side wall of an aperture 60b which receives the carrier 16b.

It should also be appreciated that various possible alternative structures are readily apparent. For example, different indicia in lieu of colors, such as geometric shapes, may be employed in the spaces with corresponding matching indicia indicated on the various function keys rather than colors. The instruction set may be integral with and not separated from the column, and the technique of writing data on the spaces through the aperture may be omitted. As mentioned, the columns 14 may be separate from the instruction set, for example carried on a pad. The instruction set is placed adjacent the uppermost sheet column of the pad to assist the user in making entries, and then the sheet is removed. In a further possible variation the carrier is omitted with the column printed on relatively stiff sheet material.

Thus, it will be seen that there is provided a calculating system which achieves the various objects of the invention and which is well suited to meet the conditions of practical usage.

As various changes might be made in the invention as set forth herein, it is to be understood that all matter herein described or shown in the accompanying drawings is to be interpreted as illustrative and not in a limiting sense.

Having thus described the invention, there is claimed as new and desired to be secured by Letters Patent:

1. A calculating system for simplified problem solving, the system comprising a user readable set of successive instructions, a columnar array of spaces, the columnar array of spaces being formed on sheet material, the array of spaces being correlated to the instruction set for user entry of data directly thereon pursuant to instructions of the instruction set, a plurality of the spaces including preprinted visible indicia thereon, the visible indicia being correlated to an algorithmic mathematical function which is related to the data to be user entered upon each of the plurality of spaces in solving a problem, an electronic calculator, the calculator including a plurality of numeral entry keys and a plurality of function keys, each function key including indicia visually associated therewith, the preprinted indicia appearing in selected spaces of the columnar array corresponding to matching indicia associated with a function key, menas associated with the electronic calculator for selectively exposing successive spaces of the columnar array whereby a user will depress function keys of the electronic calculator having indicia corresponding to the preprinted indicia appearing in successive spaces for performing an algorithm to solve the problem.

2. A calculating system constructed in accordance with claim 1 wherein the preprinted comprise colors positioned in the selected spaces and the matching indicia comprises corresponding colors visibly associated with each function key.

3. A calculating system constructed in accordance with claim 1 wherein the means associated with the calculator for selectively exposing successive spaces of the array comprises a panel having an aperture therethrough and means for advancing the array behind the panel with individual spaces selectively visible through the aperture.

4. A calculating system constructed in accordance with claim 3 wherein the panel is unitary with the calculator.

5. A calculating system constructed in accordance with claim 3 further including a bracket releasably secured to the calculator, the bracket including the panel.

6. A calculating system constructed in accordance with claim 1 wherein the means for selectively exposing successive spaces of the array includes a carrier, the columnar array being positioned within the carrier.

7. A calculating system constructed in accordance with claim 6 wherein the means for selectively exposing successive spaces of the array includes indexing means for positioning the carrier.

8. A calculating system constructed in accordance with claim 1 wherein the columnar array of spaces and the instruction set are printed on a single sheet.

9. A calculating system constructed in accordance with claim 8 wherein the single sheet includes a line of perforations, the columnar array being separable from the instruction set along the line of perforations.

* * * * *